United States Patent
Seino et al.

(10) Patent No.: US 6,235,215 B1
(45) Date of Patent: May 22, 2001

(54) MIXED 1,1,1,2-TETRAFLUOROETHANE AND TRIFLUOROMETHANE REFRIGERANTS

(75) Inventors: Toshio Seino; Masanov Yosioka, both of Tokyo (JP)

(73) Assignees: Dairei Co., Ltd.; Susumu Kurita, both of Tokyo (JP)

(*) Notice: Subject to any disclaimer, the term of this patent is extended or adjusted under 35 U.S.C. 154(b) by 0 days.

(21) Appl. No.: 08/217,030

(22) Filed: Mar. 24, 1994

Related U.S. Application Data

(63) Continuation of application No. 07/999,379, filed on Dec. 31, 1992, now abandoned.

(30) Foreign Application Priority Data

Mar. 5, 1992 (JP) .................................................. 4-048704

(51) Int. Cl.$^7$ .................................................. C09K 5/04
(52) U.S. Cl. .................................. 252/68; 252/67; 62/114
(58) Field of Search ........................... 252/67, 68; 62/114

(56) References Cited

U.S. PATENT DOCUMENTS

| | | | |
|---|---|---|---|
| 1,325,665 | * 12/1919 | Crawford | 252/67 |
| 4,482,465 | * 11/1984 | Gray | 252/67 |
| 4,851,144 | * 7/1989 | McGraw et al. | 252/52 A |
| 5,254,280 | * 10/1993 | Thomas et al. | 252/68 |

FOREIGN PATENT DOCUMENTS

| | | |
|---|---|---|
| 2044258 | 4/1991 | (CA) . |
| 0430169 | * 6/1991 | (EP) . |
| 0430170 | * 6/1991 | (EP) . |
| 0463773 | 1/1992 | (EP) . |
| 0539952 | 5/1993 | (EP) . |
| 1-139675 | * 6/1989 | (JP) . |
| 3-170591 | * 7/1991 | (JP) . |
| 3-170594 | * 7/1991 | (JP) . |
| 4-18485 | * 1/1992 | (JP) . |
| 92/16597 | * 10/1992 | (WO) . |

OTHER PUBLICATIONS

Database WPIL, Week 9136, Derwent Publication Ltd., London, GB; AN 91–262361, Japanese Patent 3–170,591, 1991.

Database WPIL, Week 9136, Derwent Publication Ltd., London, GB; AN 91–262364, Japanese Patent 3–170,594, 1991.

European Search Report and Annex, Jun. 1993.

Handbook of Chemistry and Physics, 74th Edition, CRC Press, 6–130, 1994. No month available.

* cited by examiner

*Primary Examiner*—Margaret Einsmann
(74) *Attorney, Agent, or Firm*—Greenblum & Bernstein, P.L.C.

(57) ABSTRACT

A mixed fluorocarbon refrigerant comprising 1,1,1,2-tetrafluoroethane and trifluoromethane provides a refrigeration temperature of −30° C. or less. The composition can also contain a refrigerator oil and an additive. The additive is selected from the group consisting of saturated hydrocarbons, unsaturated hydrocarbons and aromatic hydrocarbons.

8 Claims, No Drawings

MIXED 1,1,1,2-TETRAFLUOROETHANE AND TRIFLUOROMETHANE REFRIGERANTS

This application is a continuation of application Ser. No. 07/999,379, filed Dec. 31, 1992, now abandoned.

BACKGROUND OF THE INVENTION

1. Field of the Invention

The present invention relates to a fluorocarbon refrigerant used as a working fluid medium in a refrigerator and other refrigeration cycles. More particularly, the present invention relates to a so-called "Freon (Fron) substitute" containing no chlorine or bromine. The Freon substitute disclosed herein is a mixed refrigerant of fluorocarbons which is able to obtain a refrigeration temperature of −30° C. or less.

2. Discussion of Background Information

Chlorofluorocarbons (CFC) have been widely used as the working fluid medium in various refrigeration cycles such as, for example, a refrigerator. However, it was recently found that CFC can damage the ozone layer of the earth. Also, to preserve the environment of the earth, each country has established its own regulations and schedules of regulations to inhibit and/or control the use of specified Freons including CFC in accordance with the provisions of international conventions. In addition to the control of specified Freons, research and development for providing a Freon substitute which does not contain chlorine, i.e., the detrimental substance which causes ozone layer damage, are being carried out in a great many companies and institutes. Moreover, as a result of recent studies, the ozone layer damage caused by the specified Freons was noted to be a very important and severe problem which must be promptly solved, and accordingly each country started to practice the established regulations earlier than scheduled.

On the other hand, Freon 502 (azeotropic mixture of $HClF_2$ and $C_2ClF_5$) and Freon 13B1 ($CBrF_3$) are known to obtain a refrigeration temperature of −30° C. or less. However, both of these Freons cannot be used or are listed high on the schedule of regulations, because they contain chlorine or bromine. A Freon substitute (HFC) having an evaporation temperature (boiling point) of −30° C. or less has not yet been developed.

SUMMARY OF THE INVENTION

In view of the above-described technical background, one object of the present invention is to provide a novel refrigerant which does not contain chlorine or bromine, and which can obtain a refrigeration temperature of −30° C. or less.

According to the present invention, the above object can be attained by a mixed fluorocarbon refrigerant which is characterized by containing Freon 134a (namely, 1,1,1,2-tetrafluoroethane; $CH_2FCF_3$) and Freon 23 (namely, trifluoromethane; $CHF_3$).

Note that the present invention was made as a result of careful and thorough studies concerning the combined use of two or more fluorocarbons which contain hydrogen, but are free from chlorine and bromine, to thereby obtain a Freon working fluid medium having a boiling point of −30° C. or less.

The present disclosure relates to subject matter contained in Japanese patent application No. 04-48704 (filed on Mar. 5, 1992) which is expressly incorporated herein by reference in its entirety.

DETAILED DESCRIPTION OF THE PREFERRED EMBODIMENT

The fluorocarbon refrigerant according to the present invention, as mentioned above, comprises two types of fluorocarbons or Freons. One Freon is Freon 134a, having a boiling point of −26.3° C. Another Freon is Freon 23, having a boiling point of −82.0° C. A mixture of these Freons is a non-azeotropic mixture. It should be noted, however, that the non-azeotropic mixture of Freon 134a and Freon 23 can provide a boiling point (refrigeration temperature) of −30° C. or less. The term "refrigeration temperature" used herein means the temperature typically occurring in a refrigerator or other machine.

Surprisingly, although a detailed mechanism thereof has not yet been clarified, it was noted that the boiling point of −30° C. or less can always be obtained, even if Freon 134a is mixed with a very small quantity of Freon 23.

The fluorocarbon refrigerant according to the present invention contains preferably 60 to 95% by weight of Freon 134a and 5 to 40% by weight of Freon 23. The preferred compositions should have a when the boiling point of −40° C. or less.

As described above, Freon 134a is preferably used in a mixing ratio of 60 to 95% by weight of the refrigerant to obtain the boiling point of −40° C. or less. If its mixing ratio exceeds 95% by weight, namely, if an amount of Freon 23 is used which is less than 5% by weight, it becomes difficult to obtain a stable refrigeration temperature of −40° C. or less. And, if the mixing ratio of Freon 23 exceeds 40% by weight, namely, if an amount of Freon 134a is used which is less than 60% by weight, the discharging pressure of the refrigerator or compressor might increase excessively. To avoid problems due to increased pressure, it is necessary to use a specially designed compressor. Note, if it is desired to obtain a refrigeration temperature of −45° C. or less without excessive increase in pressure, it is preferred to combine 80±5% by weight of Freon 134a and 20±5% by weight of Freon 23. Preferably, the best results will be obtained when 76±2% by weight of Freon 134a is combined with 24±2% by weight of Freon 23.

The mixed fluorocarbon refrigerant of the present invention may contain at least one additive selected from the group consisting of saturated hydrocarbons, unsaturated hydrocarbons and aromatic hydrocarbons. These additions to further reduce the refrigeration temperature and also reduce, rather than increase, the discharge pressure.

The saturated hydrocarbons used herein as an additive are generally represented by the formula: $C_nH_{2n+2}$; wherein n represents an integer, and typical examples thereof include methane, ethane, propane, butane, pentane and isopentane. Preferably, isopentane is used as the additive. Moreover, very good results will be obtained if a refrigerant additive of high molecular weight hydrocarbons, trade name "SDG" commercially available from Daiei Yakuhin Kogyo Kabushiki Kaisha, is used herein.

The unsaturated hydrocarbons used herein are generally represented by the formula: $C_nH_{2n}$; wherein n is as defined above, and typical examples thereof include ethylene, propylene, butylene and pentene. Preferably, pentene is used.

The aromatic hydrocarbons used herein include, for example, benzene, toluene and ethylbenzene.

It was found that these hydrocarbon additives can increase the mixability of Freon 134a and Freon 23, further reduce the boiling point of the resultant refrigerant, and also reduce the discharging temperature of the machine.

The hydrocarbon additives could be added to either one of or both the refrigerant mixture or a refrigerator oil. By adding these additives to the refrigerator oil, it becomes possible to prevent sludge formation because of a high solubility of the additives in the oil. Accordingly stable operation of the refrigerator can be attained for a long period of time. It was also found that recycling of the oil was improved.

The isopentane additive can be present in the refrigerant in an amount of about 1.4 to 50.7 percent by weight of the total weight of the refrigerant. In this regard, the additive(s) can be present in an amount of at least about 7 percent by weight of the total weight of the refrigerant, and still yet in an amount of at least about 14 percent by weight of the total weight of the refrigerant.

The amount of additives, when added to a refrigerator oil, is preferably 1 to 30% and more preferably 3 to 30% by weight with regard to the amount of the oil. An amount less than 1% by weight is not enough to give an advantageous effect on the refrigerator oil, and also it does not cause a significant change in the refrigeration capacity of the refrigerator. Contrary to this, when the amount of the additives exceeds 30% by weight, both the compression rate and refrigeration capacity tend to be reduced.

The present invention will be further described with reference to working examples thereof. Note that Freon 134a and Freon 23 used herein each have the following physical properties, and as is apparent from these properties, the novel mixed refrigerant of the present invention is a mixture of two, entirely different fluorocarbons.

TABLE 1

| Item | Freon 134a | Freon 23 |
|---|---|---|
| chemical name | 1,1,1,2-tetrafluoroethane | trifluoromethane |
| chemical formula | $CH_2FCF_3$ | $CHF_3$ |
| molecular weight | 102.03 | 70.01 |
| boiling point (° C.) | −26.3 | −82.03 |
| freezing point (° C.) | −101 | −155.2 |
| critical temperature (° C.) | 102.0 | 25.9 |
| critical pressure (kgf/cm$^2$) | 42.0 | 49.3 |
| critical density (g/cm$^3$) | 0.50 | 0.525 |
| density | | |
| saturated liquid at 25° C. (g/cm$^3$) | 1.206 | 0.670 |
| saturated vapor at 25° C. (g/l) | 32 | 4.66 |
| specific heat atmospheric pressure | | |

TABLE 1-continued

| Item | Freon 134a | Freon 23 |
|---|---|---|
| vapor at 25° C. (cal/g ° C.) | 0.20 | 0.176 |
| latent heat of evaporation at boiling point (cal/g) | 51.7 | 57.04 |
| thermal conductivity | | |
| saturated liquid at 25° C. (Kcal./m hr. ° C.) | 0.07 | 0.117 |
| atmospheric pressure vapor at 25° C. (Kcal./m hr. ° C.) | 0.009 | 0.012 |
| viscosity | | |
| saturated liquid at 25° C. (cP) | 0.20 | 0.303 |
| atmospheric pressure vapor at 25° C. (cP) | 0.012 | 0.015 |
| dielectric constant | | |
| atmospheric pressure vapor at 25° C. | 1.02 | (no data) |

EXAMPLES 1A, 1B, 1C, 1D, 1E, 1F, 1G and 1H

A mixed fluorocarbon refrigerant was prepared by mixing Freon 134a and Freon 23 in different mixing ratios, based on % by weight. The mixed refrigerant was introduced and sealed in a refrigerator/compressor (product of Dunfoss, Model F-14L), and the refrigerator was operated in accordance with the conventional manner. The experiments were carried out with regard to the items described in the following table (Table 2) which also includes the results of the experiments. Note, in each example, the total weight of the refrigerant was 220 g, and a refrigerator oil was added in the amount of 600 cc.

TABLE 2

| | Examples | | | | | | | |
|---|---|---|---|---|---|---|---|---|
| items | 1A | 1B | 1C | 1D | 1E | 1F | 1G | 1H |
| mixing ratio of Freon 134a:Freon 23 (wt. %:wt. %) | 50:50 | 60:40 | 70:30 | 76:24 | 80:20 | 90:10 | 95:5 | 97:3 |
| discharge pressure abs (kg/cm$^2$) | 33.250 | 25.033 | 22.533 | 19.585 | 17.033 | 13.783 | 14.283 | 13.783 |
| intake pressure abs (Kg/cm$^2$) | 2.321 | 1.633 | 1.333 | 1.103 | 0.897 | 1.833 | 0.761 | 0.693 |
| compression ratio | 14.35 | 15.33 | 16.90 | 17.76 | 18.99 | 15.33 | 18.77 | 19.89 |
| refrigeration temp. (° C.) | −42.3 | −50.5 | −48.3 | −49.5 | −49.4 | −50.5 | −37.1 | −34.0 |
| room temp. (° C.) | 30 | 30 | 30 | 30 | 30 | 30 | 30 | 30 |
| temp. of discharge pipe (° C.) | 95.5 | 70.9 | 86.9 | 62.3 | 58.9 | 53.7 | 67.0 | 54.8 |
| temp. of intake pipe (° C.) | 42.0 | 39.5 | 38.6 | 37.5 | 37.1 | 38.6 | 18.7 | 17.9 |

The results recorded in Table 2 indicate that a refrigeration temperature of less than −30° C. could be obtained in each mixing ratio. Since the discharge pressure may increase with a reduction in the amount of Freon 134a used in the mixed refrigerant, an amount of Freon 134a which is below 60% by weight should be avoided.

EXAMPLES 2A, 2B, 2C, 2D, 2E, 2F, 2G and 2H

The procedure of Examples 1A to 1H was repeated except that Freon 134a and Freon 23 were mixed in different ratios and isopentane as an additive was added to the refrigerator oil as shown in Table 3. Note that the amount of the refrigerant is 220 g and the amount of the refrigerator oil is 600 cc. The results of experiments are summarized in the following table (Table 3).

Note that Examples 3A and 3B are intended to ascertain the results when the best mixing ratio of Freon 134a and Freon 23 is applied, Example 3C is intended to ascertain a lower limit of the amount of Freon 23, and Examples 3D and 3E are intended to ascertain the results when an aromatic hydrocarbon additive and an unsaturated hydrocarbon additive are added to the oil, respectively. The results of the experiments are summarized in the following table (Table 4).

TABLE 3

| items | Examples | | | | | | | |
|---|---|---|---|---|---|---|---|---|
| | 2A | 2B | 2C | 2D | 2E | 2F | 2G | 2H |
| mixing ratio of Freon 134a:Freon 23 (wt. %:wt. %) | 60:40 | 76:24 | 76:24 | 76:24 | 76:24 | 76:24 | 80:20 | 90:10 |
| amount of isopentane (cc) | 25 | 5 | 25 | 50 | 100 | 180 | 25 | 25 |
| discharge pressure abs (kg/cm$^2$) | 22.783 | 21.033 | 19.283 | 15.283 | 15.033 | 14.853 | 14.783 | 12.533 |
| intake pressure abs (Kg/cm$^2$) | 1.533 | 1.183 | 1.283 | 1.133 | 1.233 | 1.198 | 0.897 | 0.761 |
| compression ratio | 14.86 | 17.78 | 15.03 | 13.49 | 12.19 | 12.02 | 16.43 | 16.47 |
| refrigeration temp. (° C.) | −55.1 | −46.6 | −53.5 | −53.9 | −50.0 | −46.5 | −54.4 | −47.3 |
| room temp. (° C.) | 30 | 30 | 30 | 30 | 30 | 30 | 30 | 30 |
| temp. of discharge pipe (° C.) | 71.4 | 73.4 | 65.9 | 61.0 | 63.8 | 62.5 | 57.1 | 55.7 |
| temp. of intake pipe (° C.) | 38.1 | 38.2 | 37.4 | 35.4 | 34.4 | 32.5 | 34.9 | 33.3 |

The results recorded in Table 3 indicate that as a result of the addition of isopentane, the refrigeration temperature was further reduced and at the same time, the discharge pressure was lowered, in comparison with the results of Examples 1A to 1E. It was proved that the elevation of the discharge pressure can be avoided by adding isopentane, even if Freon 23 is used in a relatively increased amount. In Examples 2E and 2F, the respective refrigerator oils were weakened because of a decrease in viscosity.

EXAMPLES 3A, 3B, 3C, 3D and 3E

The procedure of Examples 1A to 1D was repeated except that the mixed refrigerant used in each example was prepared by mixing Freon 134a and Freon 23 in different mixing ratios, based on % by weight, of 76:24 (Examples 3A and 3B), 95:5 (Example 3C) and 76:24 (Examples 3D and 3E), and that in each example, an additive was added to the refrigerator oil as listed below.

| Example No. | additive | amount (cc) | total weight of refrigerant (g) | total amount of refrigerator oil (cc) |
|---|---|---|---|---|
| 3A | isopentane | 50 | 220 | 600 |
| 3B | isopentane | 50 | 227 | 600 |
| 3C | isopentane | 50 | 220 | 600 |
| 3D | ethylbenzene* | 50 | 227 | 600 |
| 3E | pentene** | 50 | 227 | 600 |

*an aromatic hydrocarbon
**an unsaturated hydrocarbon

TABLE 4

| items | Examples | | | | |
|---|---|---|---|---|---|
| | 3A | 3B | 3C | 3D | 3E |
| mixing ratio of Freon 134a:Freon 23 (wt. %:wt. %) | 76:24 | 76:24 | 95:5 | 76:24 | 76:24 |
| additive (50 cc) | iso-pentane | iso-pentane | iso-pentane | ethyl-benzene | pentene |
| discharge pressure abs (kg/cm$^2$) | 15.283 | 15.033 | 10.033 | 16.553 | 14.285 |
| intake pressure abs (Kg/cm$^2$) | 1.133 | 1.033 | 0.761 | 1.033 | 0.999 |
| compression ratio | 13.49 | 14.55 | 13.184 | 16.00 | 14.30 |
| refrigeration temp. (° C.) | −53.6 | −54.8 | −43.2 | −50.9 | −53.7 |
| room temp. (° C.) | 30 | 30 | 30 | 30 | + |
| temp. of discharge pipe (° C.) | 61.0 | 65.6 | 67.0 | 69.1 | 71.0 |
| temp. of intake pipe (° C.) | 35.4 | 31.8 | 18.7 | 37.4 | 33.9 |

The results recorded in Table 4 indicate that in Examples 3A and 3B, a refrigeration temperature approaching −55° C. was obtained, while the discharge pressure was maintained at a low level. The results of Example 3C evidence that even if Freon 23 is used in a mixing ratio of only 5% by weight, a refrigeration temperature of −40° C. can be obtained. Further, the results of Examples 3D and 3E evidence that similar results can be obtained when the aromatic hydrocarbons or unsaturated hydrocarbons are used as an additive to the refrigerator oil.

EXAMPLES 4A, 4B, 4C and 4D

The procedure of Examples 1A to 1H was repeated except that the mixed refrigerant used in each example was prepared by mixing Freon 134a and Freon 23 in a mixing ratio, based on % by weight, of 76:24, and that in each example, a combination of additives was added to the refrigerator oil as listed below.

| Example No. | additive | amount (cc) | total weight of refrigerant (g) | total amount of refrigerator oil (cc) |
|---|---|---|---|---|
| 4A | A + B | 15 + 15 | 227 | 600 |
| 4B | A + C | 15 + 15 | 227 | 600 |
| 4C | B + C | 15 + 15 | 227 | 600 |
| 4D | A + B + C | 10 + 10 + 10 | 227 | 600 |

Notes:
A represents isopentane.
B represents pentene.
C represents ethylbenzene.

The results of the experiments are summarized in the following table (Table 5).

TABLE 5

| items | Examples | | | |
|---|---|---|---|---|
| | 4A | 4B | 4C | 4D |
| mixing ratio of Freon 134a:Freon 23 (wt. %:wt. %) | 76:24 | 76:24 | 76:24 | 76:24 |
| additive (30 cc) | A + B | A + C | B + C | A + B + C |
| discharge pressure abs (kg/cm$^2$) | 17.283 | 17.533 | 18.033 | 17.283 |
| intake pressure abs (Kg/cm$^2$) | 1.183 | 1.133 | 1.183 | 1.083 |
| compression ratio | 14.61 | 15.48 | 15.24 | 15.96 |
| refrigeration temp. (° C.) | −54.5 | −54.0 | −51.9 | −54.3 |
| room temp. (° C.) | 30 | 30 | 30 | 30 |
| temp. of discharge pipe (° C.) | 71.4 | 68.4 | 68.7 | 69.3 |
| temp. of intake pipe (° C.) | 36.6 | 37.2 | 37.8 | 36.4 |

The results recorded in Table 5 indicate that the refrigeration temperature of −51° C. or less can be obtained by employing a combination of two or more additives.

As will be appreciated from the above descriptions, according to the present invention, a mixed fluorocarbon refrigerant which does not cause the problem of ozone layer damage, and which also reduces the temperature of a refrigerator to −30° C. or less can be obtained.

What is claimed is:

1. A mixed refrigerant, comprising:
a mixture comprising 60 to 95% by weight 1,1,1,2-tetrafluoroethane, and 5 to 40% by weight trifluoromethane, said mixture further comprising isopentane, said isopentane being present in an amount of 1.4 to 50.7% by weight of the mixture, to obtain a refrigeration temperature of less than or equal to −51° C., and further comprising at least one additive selected from the group consisting of pentene and ethylbenzene.

2. A mixed refrigerant, comprising:
a mixture comprising 60 to 95% by weight 1,1,1,2-tetrafluoroethane, and 5 to 40% by weight trifluoromethane, said mixture further comprising at least two additives selected from the group consisting of pentene, isopentane and ethylbenzene, said at least two additives being present in an amount effective to obtain a refrigeration temperature of less than or equal to −51° C.

3. The mixed refrigerant according to claim 2, comprising 75 to 85% by weight 1,1,1,2-tetrafluoroethane and 15 to 25% by weight trifluoromethane.

4. The mixed refrigerant according to claim 2, further comprising a refrigerator oil.

5. A method of refrigeration comprising adding a mixed refrigerant to a refrigerator, wherein said mixed refrigerant comprises 60 to 95% by weight 1,1,1,2-tetrafluoroethane, 5 to 40% by weight trifluoromethane, and isopentane, said isopentane being present in an amount of 1.4 to 50.7% by weight of the mixture, to obtain a refrigeration temperature of less than or equal to −51° C. and further comprising adding to said mixed refrigerant at least one additive selected from the group consisting of pentene and ethylbenzene.

6. A method of refrigeration comprising adding a mixed refrigerant to a refrigerator, wherein said mixed refrigerant comprises 60 to 95% by weight 1,1,1,2-tetrafluoroethane, 5 to 40% by weight trifluoromethane, and at least two additives selected from the group consisting of pentene, isopentane and ethylbenzene, said at least two additives being present in an amount effective to obtain a refrigeration temperature of less than or equal to −51° C.

7. The method of refrigeration according to claim 6, wherein said mixed refrigerant comprises 75 to 85% by weight 1,1,1,2-tetrafluoroethane and 15 to 25% by weight trifluoromethane.

8. The method of refrigeration according to claim 6, further comprising adding refrigerator oil to the mixed refrigerant.

* * * * *